Figure 1:
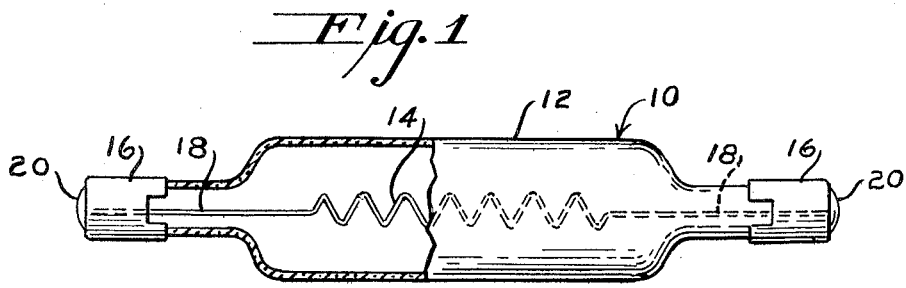

May 24, 1966  T. H. ELMER ET AL  3,253,174

GLASS FOR INCANDESCENT DISCHARGE LAMPS

Filed March 15, 1962

INVENTORS
THOMAS H. ELMER
AND MARTIN E. NORDBERG

BY Clarence R. Patty, Jr.
ATTORNEY 3,253,174
GLASS FOR INCANDESCENT DISCHARGE LAMPS
Thomas H. Elmer and Martin E. Nordberg, Corning,
N.Y., assignors to Corning Glass Works, Corning,
N.Y., a corporation of New York
Filed Mar. 15, 1962, Ser. No. 179,843
1 Claim. (Cl. 313—110)

This invention relates to an electric lamp adapted to operate at an envelope temperature within the range of 500–1100° C. and provide high intensity illumination from which short wave length radiation in the ultraviolet region has been filtered out. It is particularly concerned with an incandescent lamp having a silica glass envelope adapted to function as an ultraviolet radiation filter.

A high intensity, tungsten filament lamp, containing iodine to inhibit darkening and prolong lamp life, has recently been developed. This lamp has found particular utility as a compact camera attachment lamp, although its usefulness is in no way so limited. In connection with developing this lamp for camera use in particular, certain problems have arisen requiring an improved lamp construction. A particular purpose of the present invention is to provide a solution to such problems and thereby provide an improved electric lamp of this type.

Such compact, high intensity lamps not only generate a high degree of illumination, but also a high degree of heat during operation. As a result, envelope temperatures on the order of 850 to 900° C. are customarily encountered in a 650 watt commercial lamp of this type. Accordingly, it has been found necessary to employ a high temperature lamp envelope formed from a high silica glass, such as fused quartz or a glass of the type known as 96% silica glass.

Also, such lamps normally generate a substantial amount of short wave length radiation in the ultraviolet, that is radiation at wave lengths below about 350 millimicrons. Exposure to such ultraviolet radiation may cause visual fatigue, and prolonged exposure may even be harmful to the human eye. This problem does not arise in the ordinary low temperature incandescent lamp. The smaller amount of radiation generated is essentially removed by the alkali silicate glass envelopes employed in such lamps. It is a further purpose of the present invention to provide an improved incandescent lamp having a silica glass envelope adapted to function as an ultraviolet radiation filter.

It is not only necessary to effectively remove the short wave length radiation, but it is also highly desirable to accomplish this end without appreciably coloring the glass envelope, that is removing a substantial portion of the radiation in the visible region of the spectrum. Accordingly, a relatively sharp radiation cutoff within the range of 300 to 360 millimicrons is particularly desired. In one type of lamp, for example, it is required that transmission at 300 millimicrons be below about 35% while transmission above 360, that is in the visible region, be on the order of 80–90%.

It has now been discovered that a high temperature lamp envelope satisfactorily providing the desired ultraviolet filter and light transmitting requirements can be produced by incorporating in a silica glass of the types indicated above, a limited amount of an ultraviolet absorbing metal ion. It has further been found that the effective amount of absorbing ion, that is the amount effective to provide a cutoff at a particular wave length, is dependent on the temperature of the glass envelope during operation. In particular, the effective cutoff line for a given concentration of absorbing metal ion in a glass may increase by about twenty-five millimicrons as envelope temperature changes from room temperature to an operating temperature of 900° C.

The invention is an electric lamp adapted to operate with an envelope temperature within the range of 500–1100° C., the lamp comprising a light source which additionally generates a substantial amount of ultraviolet radiation and a high temperature, transparent, essentially colorless, glass envelope containing up to about 0.3% of an ultraviolet absorbing metal ion additive whereby a major amount of the radiation below a wave length of about 300 millimicrons is absorbed during lamp operation.

Various metal ions in such small amount are capable of absorbing or filtering out the undesired ultraviolet radiation. However, vanadium, cerium and molybdenum have been found especially suitable because of their relatively sharp cutoff curves in the 300–360 millimicron region just below the visible radiation range. Molybdenum and vanadium are particularly advantageous in this respect. However, there is a somewhat greater tendency for the former to be lost by volatilization at elevated temperatures. Hence vanadium is generally preferred to facilitate production control. For most purposes about 0.03–0.3% of metal ion additive, calculated as the metal added to the glass, is adequate. Smaller amounts tend to be less effective and larger amounts tend to color the glass, that is absorb appreciably in the visible portion of the spectrum. Also, in these small amounts there is essentially no effect on the desired high temperature softening characteristics of the lamp envelope.

It will be understood that metal ion percentages are based on a one mm. thick glass envelope or other article. The effectiveness increases directly with wall thickness whereby the percent content required for a given effect decreases as wall thickness increases. Thus, an envelope of two mm. wall thickness containing 0.05% of a given metal ion will be equivalent to a one mm. wall envelope containing 0.10% of the ion.

Various features, objects and advantages of the invention not heretofore mentioned will become apparent from the following description which is made in connection with and in reference to the accompanying drawing.

Figure 2:
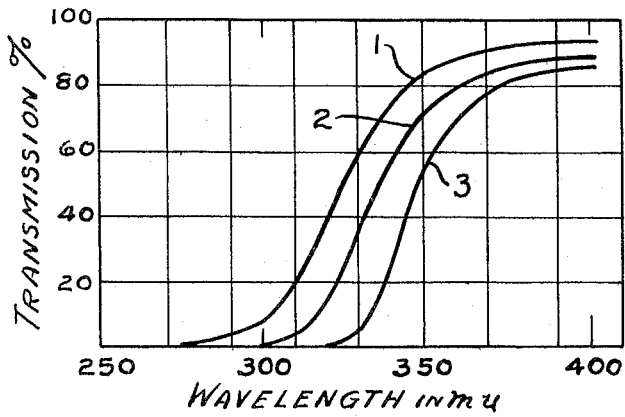
Figure 3:
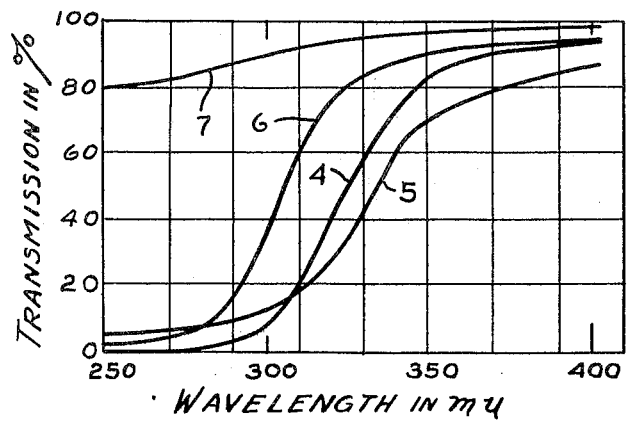

FIGURE 1 shows, partly broken away, a particular embodiment of the invention, and FIGURES 2 and 3 graphically illustrate the absorbing characteristics of envelopes particularly adapted to use in such device.

In FIGURE 1, an incandescent lamp 10 has a tubular glass envelope 12, a tungsten filament 14 and ceramic sleeve insulators 16. Filament 14 is fusion sealed in envelope 12 at ends 18—18 thereof, and electrically connected to terminal button 20 in conventional manner. Sleeves 16 are adapted to be inserted in snap-type sockets (not shown), which connect terminal contacts 20 to a source of electrical current. The lamp may also be assembled in conjunction with a reflector adapted to concentrate emitted light. It will be appreciated that the invention is not limited to this illustrative lamp construction, but might be utilized in other types as well, for example in a conventional base lamp.

Preferably envelope 12 is produced from a 96% silica glass in accordance with procedures generally described in United States Patent No. 2,303,756. Briefly, this involves producing a parent glass article, leaching to provide a porous silica body, impregnating with a salt solution, drying and firing to consolidate the impregnated glass. The parent article is formed in conventional manner from a selected borosilicate glass, heat treated and leached. This removes a substantial proportion of the glass constituents other than silica, and provides a porous glass article consisting essentially of about 96% silica. The porous article is impregnated with a suitable salt solution, dried and heated to a maximum temperature of about 1250° C. The porous glass consolidates during the heat treatment, and there is incorporated therein the metal ion introduced by the impregnating salt.

Impregnating solutions suitable for present purposes may be produced by dissolving a salt of the desired metal in a 0.1 N nitric acid solution. The porous glass, either directly after water washing or after drying, is immersed in the salt solution to permit the solution to move into the glass pores, an impregnation time of about ten minutes being sufficient for dry, porous tubing of about one millimeter wall thickness, a somewhat longer time being required for wet, porous glass.

The following table shows a number of suitable impregnating solutions (in grams of metal salt/100 ml. solution) and the corresponding calculated concentration of metal ions introduced into the glass. In the table, the impregnating solution is shown as grams of metal salt or oxide dissolved in the acid solution to provide 100 milliliters of impregnating solution.

TABLE I

| Glass | Solution | Metal Ion Concentration in Glass |
|---|---|---|
| 1 | 0.36 g. $V_2O_5$ | 0.05% V. |
| 2 | 0.71 g. $V_2O_5$ | 0.10% V. |
| 3 | 1.78 g. $V_2O_5$ | 0.25% V. |
| 4 | 3.09 g. $Ce(NO_3)_3.6H_2O$ | 0.25% Ce. |
| 5 | 1.24 g. $Ce(NO_3)_3.6H_2O$ + 1.07 g. $Al(NO_3)_3.9H_2O$. | 0.1% Ce + 0.02% Al. |
| 6 | 3.62 g. $Fe(NO_3)_3.9H_2O$ | 0.125% Fe. |
| 7 | 0.92 g. $(NH_4)_6Mo_7O_{24}.4H_2O$ | 0.125% Mo. |

FIGURE 2 graphically illustrates the light transmission characteristics of glass tubes having a wall thickness of 1.1–1.2 mm. and impregnated with vanadium in accordance with the practice outlined above. Curves 1, 2 and 3 represent transmission data for glasses corresponding to glasses 1, 2 and 3 of Table I above. In the graph of FIGURE 2, transmission is plotted along the vertical axis and wave length of transmitted light is plotted along the horizontal axis. Each curve on the graph thereby shows percentage of transmission for the corresponding glass at any selected wave length of radiation. The data from which the curves were plotted were obtained on a Beckman DK–2 Spectrophotometer. It will be observed that the ultraviolet cutoff, that is the wave length below which no transmission occurs, is about 275 millimicrons, 300 millimicrons, and 325 millimicrons for glasses 1, 2 and 3, respectively.

FIGURE 3 is a graphical illustration corresponding to FIGURE 2, but comparing characteristics of different metal ion additives, as well as a glass with no additive. Curve 4 is based on a tube containing 0.05% vanadium; curve 5 on a tube containing 0.10% cerium and 0.02% aluminum as a clarifying agent; curve 6 on a tube containing 0.12% molybdenum; and curve 7 on a tube with no additive. In each case the tube wall was 1.1–1.2 mm.

thick and the additive was calculated as free metal from the impregnating salt introduced. The actual amount of metal in the glass is somewhat less than the calculated amount shown here. For example, molybdenum analyzes about one-half of the calculated amount and vanadium analyzes about two-thirds of the calculated amount. In each case the tubes were fired at 1250° C. with a series of one hour's holds at and above 950° C. to permit adequate dewatering. As indicated earlier, vanadium or molybdenum are preferred because their cutoff curves are sharper, that is rise more steeply from the point of zero transmission than does the curve for a cerium ion containing glass.

Data presented in FIGURES 2 and 3 were obtained from measurements made at room temperature. Experience has shown that such transmission curves move progressively to the right, that is to high wave lengths, as the temperature of the glass increases. Thus, in a lamp operating at about 850 to 900° C. the transmission curves shown would be shifted about twenty-five millimicrons to the right. In other words, curve 3 in FIGURE 2, which has zero transmission at about 325 millimicrons at room temperature, would have its zero cutoff point at about 350 millimicrons in a lamp operating at such temperatures.

It will be seen that the invention effectively solves the problem of ultraviolet radiation without loss of high temperature characteristics in a lamp envelope, thereby prociding an improved lamp construction. Numerous modifications and changes will be apparent and are envisioned within the appended claim. In particular, the optical filter provided by the lamp envelope might, if desired, be a separate lens or globe.

What is claimed is:

An incandescent electric lamp comprising a tungsten filament light source and a high-temperature, transparent, essentially colorless, high-silica glass envelope containing from about 0.03% to 0.3% by weight of molybdenum metal ion, said envelope having a transmission of below about 20% of ultraviolet light and above about 80% of light in a visible range of the spectrum when operated at a temperature in the range of from 500° C. to 1100° C.

References Cited by the Examiner

UNITED STATES PATENTS

| 2,303,756 | 12/1942 | Nordberg et al. | 106—54 |
| 2,862,131 | 11/1958 | Escher-Desriviers | 313—112 |
| 2,864,966 | 12/1958 | Burns | 313—112 |
| 2,974,052 | 3/1961 | Bacon et al. | 106—52 |
| 3,094,642 | 6/1963 | Duval | 313—222 X |

JOHN W. HUCKERT, *Primary Examiner.*

DAVID J. GALVIN, *Examiner.*

A. J. JAMES, *Assistant Examiner.*